United States Patent
Grip et al.

(10) Patent No.: US 11,383,817 B2
(45) Date of Patent: Jul. 12, 2022

(54) MODULAR FUSELAGE ASSEMBLIES FOR AIRCRAFT, AIRCRAFT INCLUDING MODULAR FUSELAGE ASSEMBLIES, AND METHODS OF ASSEMBLING MODULAR FUSELAGE ASSEMBLIES

(71) Applicant: The Boeing Company, Chicago, IL (US)

(72) Inventors: Robert Erik Grip, Rancho Palos Verdes, CA (US); Joseph Paul Giesing, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 404 days.

(21) Appl. No.: 16/517,420

(22) Filed: Jul. 19, 2019

(65) Prior Publication Data
US 2021/0016868 A1 Jan. 21, 2021

(51) Int. Cl.
*B64C 1/06* (2006.01)
*B64C 1/12* (2006.01)
*B64C 1/22* (2006.01)

(52) U.S. Cl.
CPC .............. *B64C 1/068* (2013.01); *B64C 1/064* (2013.01); *B64C 1/12* (2013.01); *B64C 1/22* (2013.01)

(58) Field of Classification Search
CPC . B64C 1/068; B64C 1/064; B64C 1/12; B64F 5/10
See application file for complete search history.

(56) References Cited

U.S. PATENT DOCUMENTS

| 1,462,533 A | * | 7/1923 | Clark | ...................... B64C 1/064 244/119 |
| 1,578,073 A | * | 3/1926 | Caproni | .................. B64C 1/068 244/120 |

(Continued)

FOREIGN PATENT DOCUMENTS

| DE | 952595 | 11/1956 |
| DE | 102010035787 | 3/2012 |

(Continued)

OTHER PUBLICATIONS

European Patent Office, Extended European Search Report for related European Patent Application No. 20176108, dated Nov. 6, 2020.

(Continued)

*Primary Examiner* — Philip J Bonzell
(74) *Attorney, Agent, or Firm* — Dascenao Gates Intellectual Property Law, P.C.

(57) ABSTRACT

Modular fuselage assemblies for aircraft, aircraft including modular fuselage assemblies, and methods of assembling modular fuselage assemblies. A modular fuselage assembly includes a plurality of fuselage lobes that may extend along a longitudinal axis of the modular fuselage assembly. Each fuselage lobe includes a plurality of frame members and a lobe skin that is operatively attached to the plurality of frame members and defines an external surface of the fuselage lobe. The modular fuselage assembly also includes a plurality of longerons extending along a longitudinal axis of the modular fuselage assembly. At least two fuselage lobes are operatively attached to each longeron and the plurality of fuselage lobes and the plurality of longerons at least partially bound a cargo hold defined within the modular fuselage assembly. The methods include methods of assembling the modular fuselage assemblies.

21 Claims, 11 Drawing Sheets

(56) References Cited

U.S. PATENT DOCUMENTS

| | | | |
|---|---|---|---|
| 2,008,836 A * | 7/1935 | Ronan | B64C 1/061 |
| | | | 244/119 |
| 2,741,447 A * | 4/1956 | Heal | B64C 1/064 |
| | | | 244/119 |
| 9,156,559 B2 | 10/2015 | Grip et al. | |
| 2006/0108477 A1* | 5/2006 | Helou | B64C 1/10 |
| | | | 244/137.1 |
| 2009/0277994 A1* | 11/2009 | Lobato | B64C 1/12 |
| | | | 244/119 |
| 2013/0019446 A1* | 1/2013 | Venskus | B21J 15/142 |
| | | | 29/407.09 |
| 2013/0099057 A1 | 4/2013 | Martino Gonzalez et al. | |
| 2014/0076477 A1* | 3/2014 | Kismarton | B29C 70/30 |
| | | | 156/64 |
| 2017/0101168 A1* | 4/2017 | Holemans | B64C 1/12 |
| 2020/0094991 A1* | 3/2020 | Datas | B64F 5/50 |

FOREIGN PATENT DOCUMENTS

| | | | | |
|---|---|---|---|---|
| EP | 3040263 | | 7/2016 | |
| FR | 718006 | | 1/1932 | |
| GB | 2196923 A | * | 5/1988 | B64C 1/061 |

OTHER PUBLICATIONS

Machine-generated English language translation of the description and claims of FR718006, provided with the Nov. 6, 2020 Extended European Search Report.
Machine-generated English language translation of DE102010035787, downloaded from Google Patents on Dec. 21, 2020.

* cited by examiner

MODULAR FUSELAGE ASSEMBLIES FOR AIRCRAFT, AIRCRAFT INCLUDING MODULAR FUSELAGE ASSEMBLIES, AND METHODS OF ASSEMBLING MODULAR FUSELAGE ASSEMBLIES

FIELD

The present disclosure relates generally to modular fuselage assemblies for aircraft, to aircraft including modular fuselage assemblies, and/or to methods of assemblies modular fuselage assemblies.

BACKGROUND

Passenger transport is the largest market for commercial aircraft. As such, commercial aircraft, regardless of their intended final use, generally are designed and/or constructed to meet the needs of the passenger aircraft market. These designs then are modified for other applications, such as commercial freighter aircraft. This permits an aircraft manufacturer to produce a number of different sub-models of aircraft all based upon a single overall aircraft design.

While effective at meeting the needs of various market segments, this approach generally results in design compromises that may not be functionally ideal for all market segments. As an example, the need for separate cabin and luggage space within passenger transport aircraft means that commercial freighter aircraft generally include two cargo holds, one within the area utilized as cabin space within passenger transport aircraft and one within the area utilized as luggage space within passenger transport aircraft. Such a configuration is inefficient from a freight transport perspective and somewhat arbitrarily limits the size of freight that may be transported by commercial freighter aircraft.

As another example, a given model of aircraft generally is a one-size-fits-all solution with respect to the overall dimensions of the aircraft, with these dimensions being selected primarily based upon passenger transport needs. Once again, these passenger transport needs may somewhat arbitrarily limit the usefulness of the aircraft for other purposes, such as freight transport. Thus, there exists a need for modular fuselage assemblies for aircraft and/or for methods of assembling modular fuselage assemblies.

SUMMARY

Modular fuselage assemblies for aircraft and methods of assembling modular fuselage assemblies are discussed herein. A modular fuselage assembly may include a plurality of fuselage lobes that may extend along a longitudinal axis of the modular fuselage assembly. Each fuselage lobe may include a plurality of frame members and a lobe skin that is operatively attached to the plurality of frame members and defines an external surface of the fuselage lobe. The modular fuselage assembly also may include a plurality of longerons extending along the longitudinal axis of the modular fuselage assembly. At least two fuselage lobes may be operatively attached to each longeron and the plurality of fuselage lobes and the plurality of longerons may at least partially bound a cargo hold defined within the modular fuselage assembly.

The methods include methods of assembling the modular fuselage assemblies. These methods may include providing the plurality of frame members and/or providing the plurality of longerons. These methods also may include operatively attaching each frame member to at least two longerons such that the plurality of longerons extends along the longitudinal axis of the modular fuselage assembly.

DESCRIPTION

Figure 1:
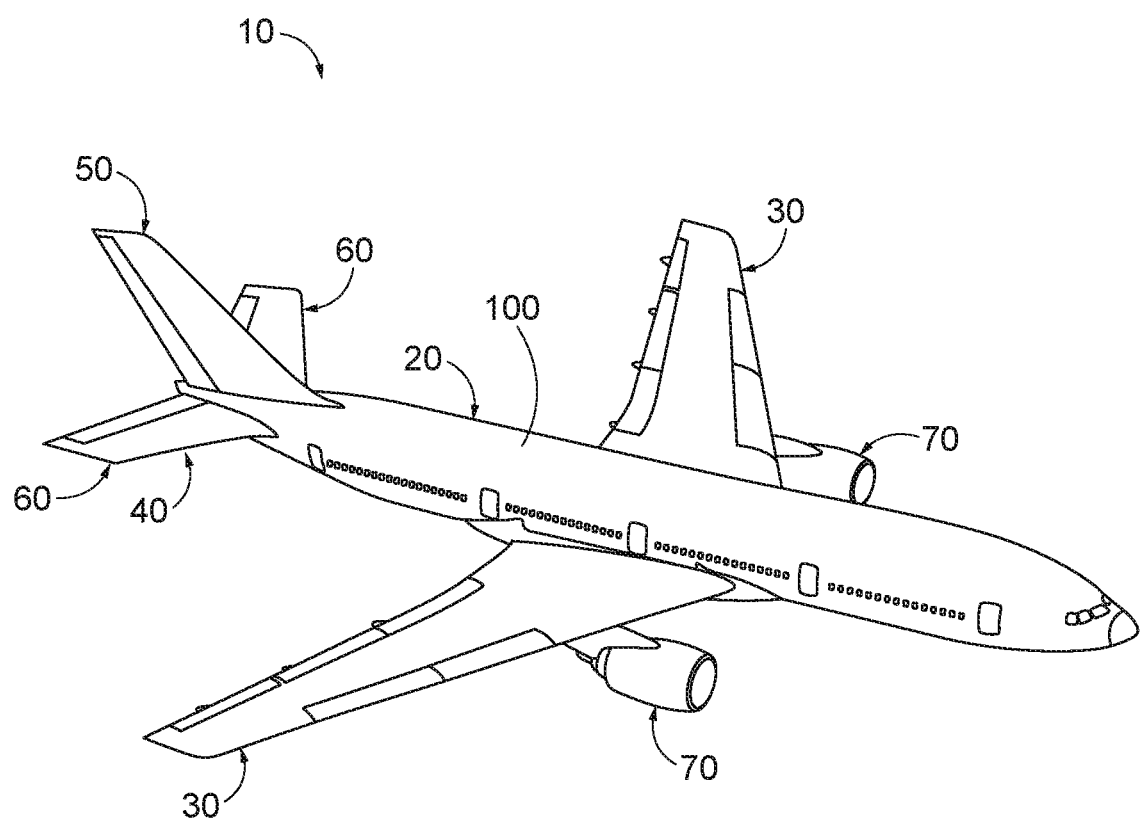
FIG. 1 is a schematic illustration of an example of an aircraft that may include and/or utilize modular fuselage assemblies, according to the present disclosure.

FIGS. 1-16 provide illustrative, non-exclusive examples of aircraft 10, of modular fuselage assemblies 100, and/or of methods 300, according to the present disclosure. Elements that serve a similar, or at least substantially similar, purpose are labeled with like numbers in each of FIGS. 1-16, and these elements may not be discussed in detail herein with reference to each of FIGS. 1-16. Similarly, all elements may not be labeled in each of FIGS. 1-16, but reference numerals associated therewith may be utilized herein for consistency.

Elements, components, and/or features that are discussed herein with reference to one or more of FIGS. 1-16 may be included in and/or utilized with any of FIGS. 1-16 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

FIG. 1 is a schematic illustration of an example of an aircraft 10 that may include and/or utilize modular fuselage assemblies 100, according to the present disclosure. Examples of modular fuselage assemblies 100 are illustrated in FIGS. 2-14 and discussed in more detail herein with reference thereto.

Aircraft 10 may include a fuselage 20 in the form of modular fuselage assembly 100. Aircraft 10 also may include at least one wing 30, which may be operatively attached to and/or may extend from fuselage 20 and/or at least one engine 70, which may be operatively attached to fuselage 20, such as via a corresponding wing 30. Aircraft 10 also may include a tail assembly 40 that may be operatively attached to and/or at least partially defined by fuselage 20. Tail assembly 40 may include at least one vertical stabilizer 50 and/or at least one horizontal stabilizer 60.

Figure 2:
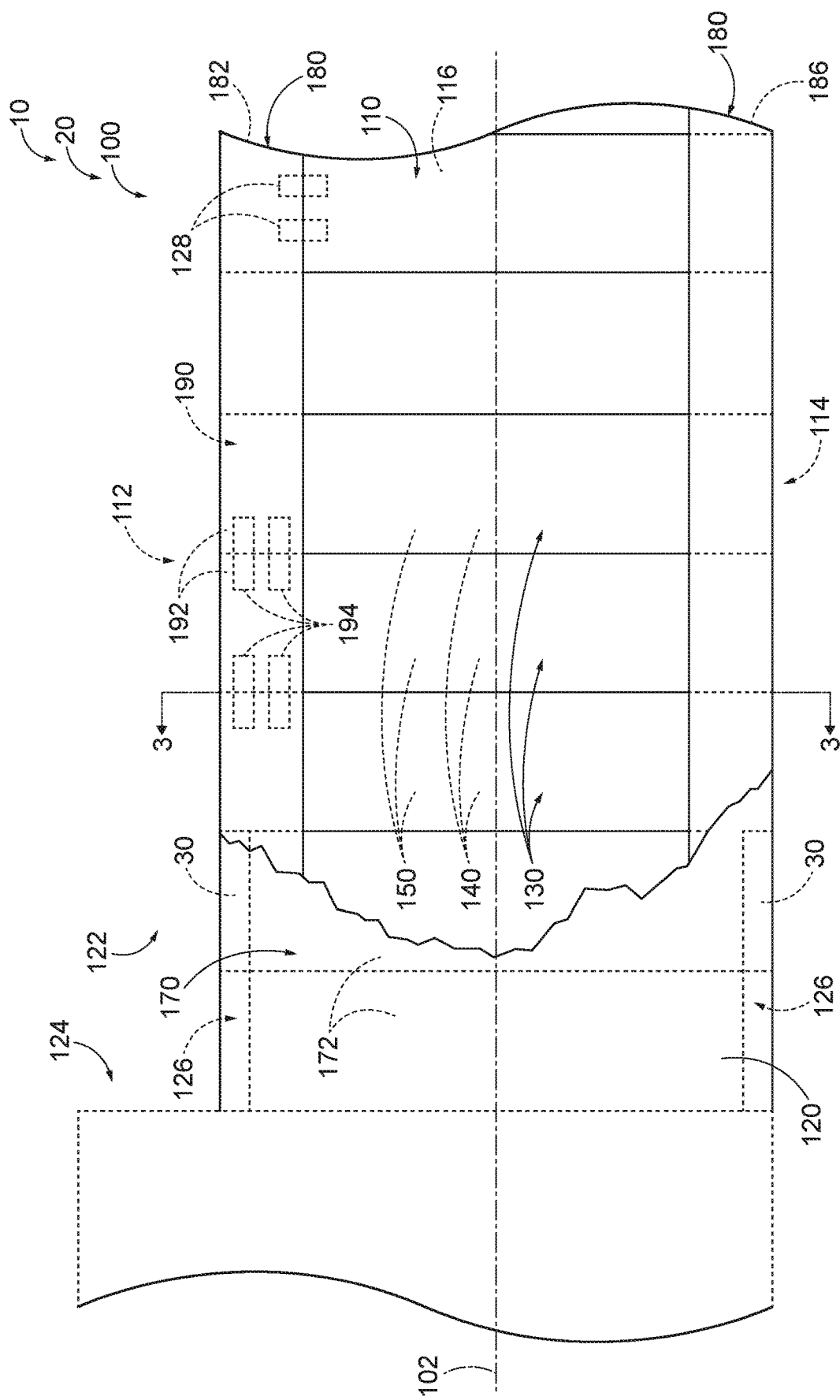
FIG. 2 is a schematic side view of examples of a modular fuselage assembly according to the present disclosure.
Figure 3:
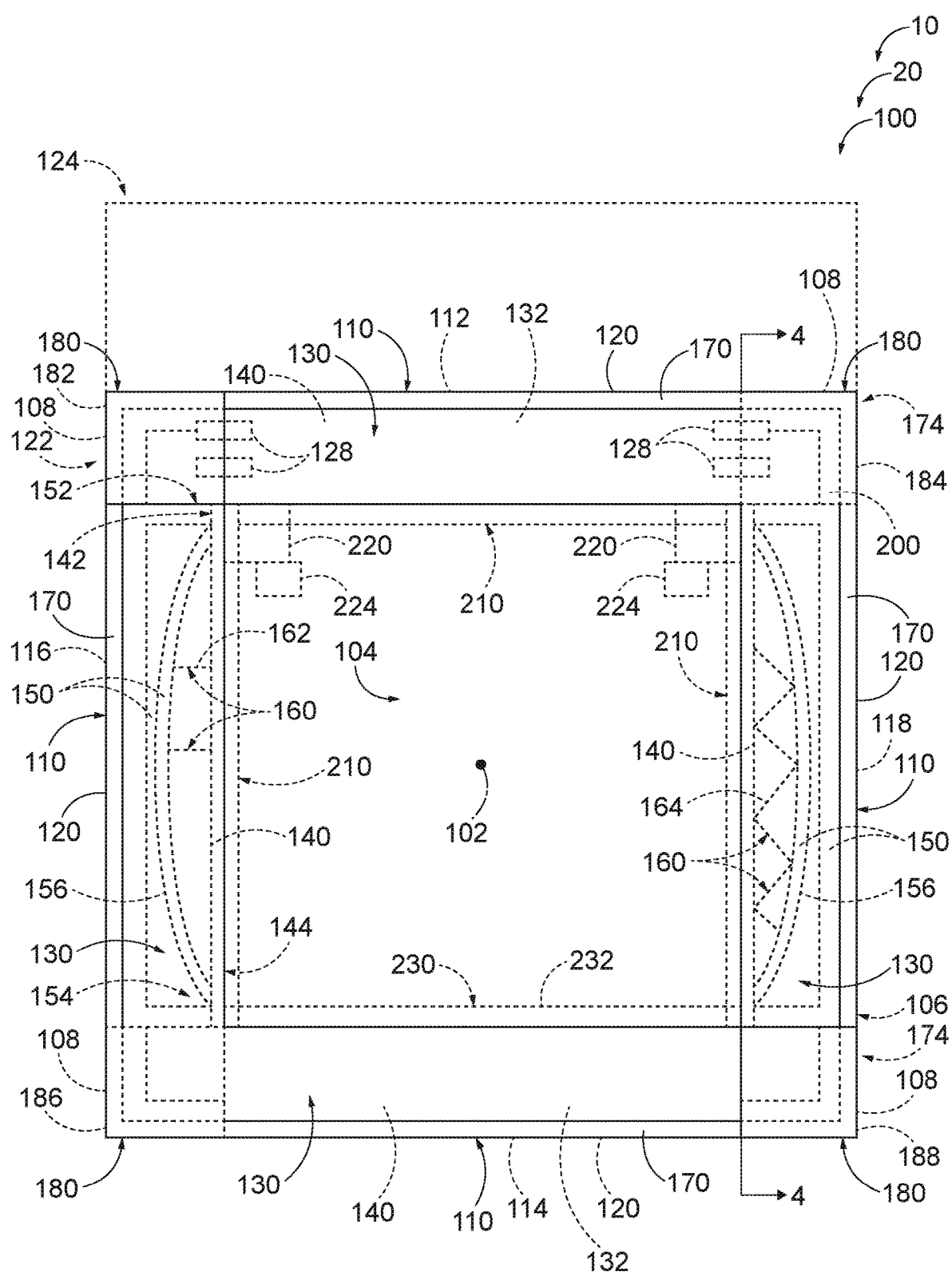
FIG. 3 is a schematic transverse cross-sectional view of the modular fuselage assembly of FIG. 2 taken along line 3-3 of FIG. 2.
Figure 4:
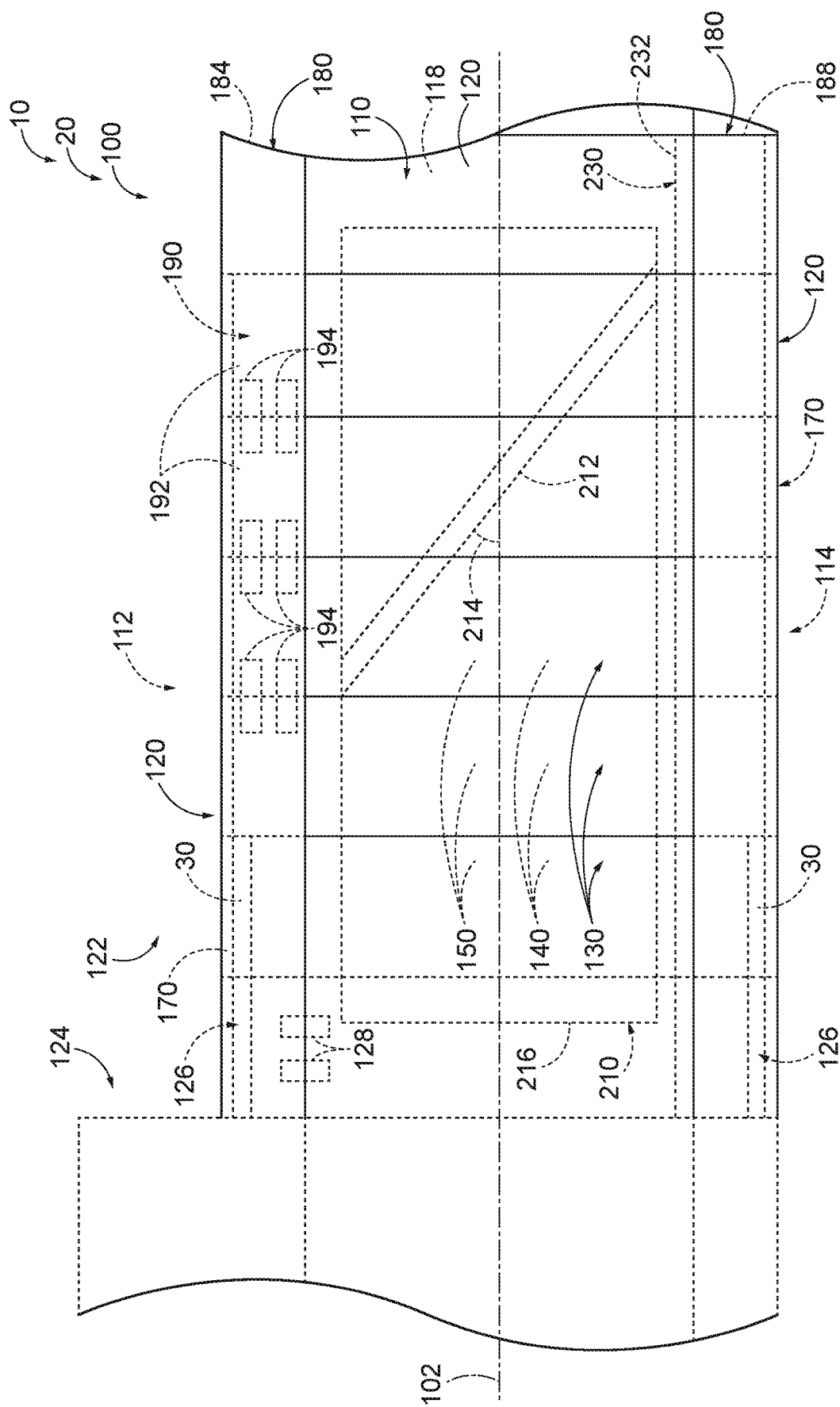
FIG. 4 is a schematic longitudinal cross-sectional view of the modular fuselage assembly of FIGS. 2-3 taken along line 4-4 of FIG. 3.
Figures 5, 6:
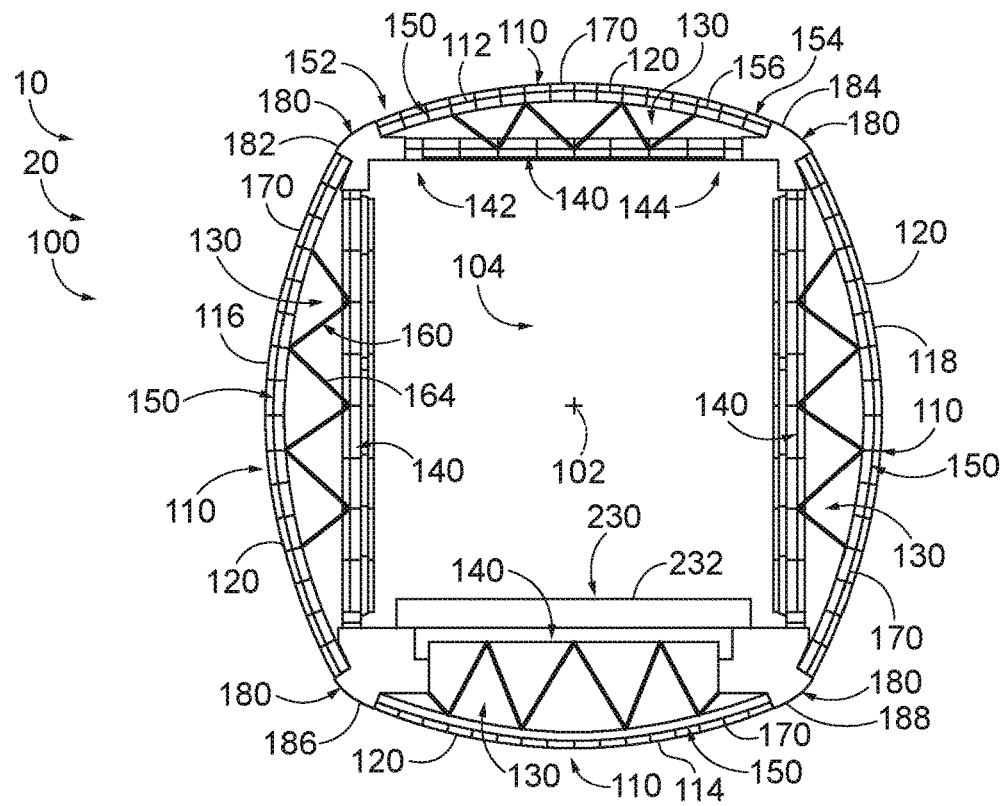
FIG. 5 is a less schematic transverse cross-sectional view of an example of a modular fuselage assembly according to the present disclosure.
FIG. 6 is a less schematic transverse cross-sectional view of an example of a modular fuselage assembly according to the present disclosure.
Figure 7:
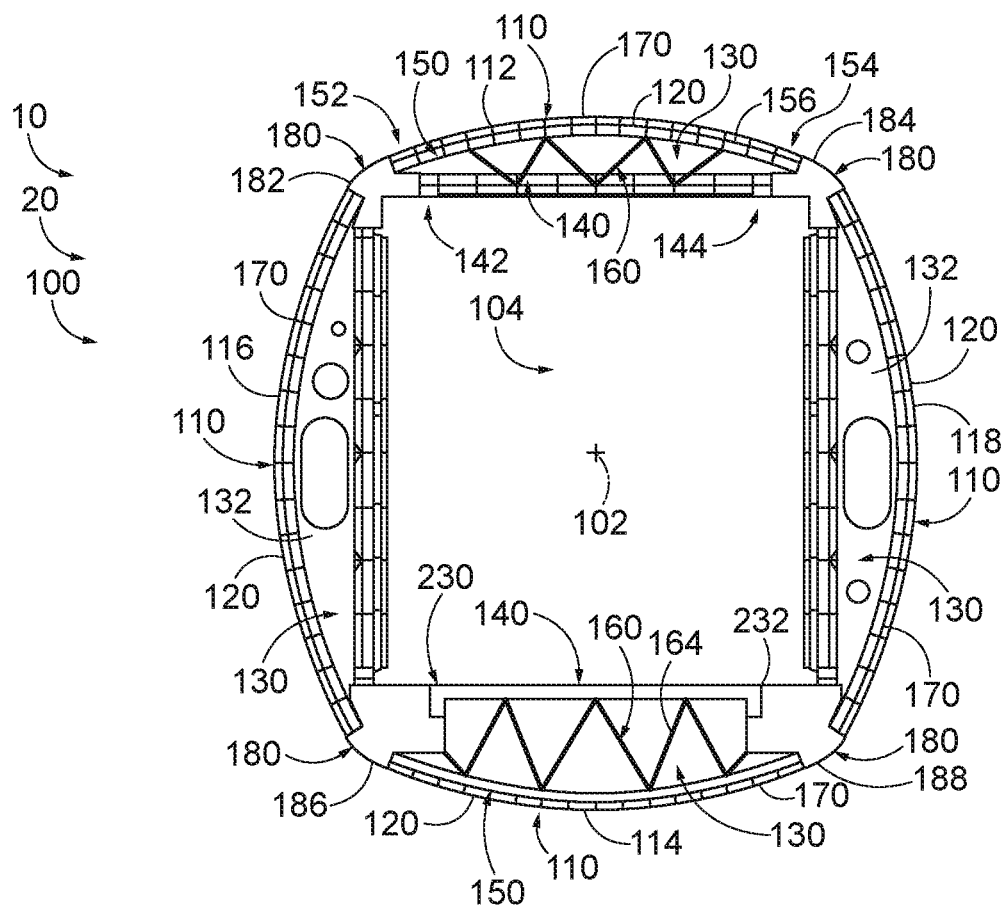
FIG. 7 is a less schematic transverse cross-sectional view of an example of a modular fuselage assembly according to the present disclosure.

FIG. 2 is a schematic side view of examples of a modular fuselage assembly 100 according to the present disclosure. FIG. 3 is a schematic transverse cross-sectional view of modular fuselage assembly 100 of FIG. 2 taken along line 3-3 of FIG. 2, and FIG. 4 is a schematic longitudinal cross-sectional view of modular fuselage assembly 100 of FIGS. 2-3 taken along line 4-4 of FIG. 3. FIGS. 5-7 are less schematic transverse cross-sectional views of examples of modular fuselage assemblies 100 according to the present disclosure.

As illustrated collectively by FIGS. 2-7, modular fuselage assemblies 100 include a plurality of fuselage lobes 110 and a plurality of longerons 180, both of which may extend along a longitudinal axis 102 of the fuselage assembly. Each fuselage lobe 110 includes a plurality of frame members 130 and a lobe skin 170. Lobe skin 170 may be operatively attached to frame members 130 and/or may form and/or define an external surface 120 of each fuselage lobe 110. As perhaps best illustrated by FIGS. 2 and 5-7, at least two fuselage lobes 110 may be operatively attached to each longeron 180, and fuselage lobes 110 and longerons 180 may at least partially bound, define, and/or surround a cargo hold 104 that may be defined within modular fuselage assembly 100.

Modular fuselage assemblies 100, which are disclosed herein, may provide several benefits over conventional fuselage assemblies of conventional aircraft. As an example and as discussed in more detail herein, it may be straightforward, effective, and/or efficient to form and/or define modular fuselage assemblies 100 that have and/or define a non-circular transverse cross-sectional shape. This non-circular transverse cross-sectional shape may include a plurality of arcuate regions that may be defined by fuselage lobes 110 and/or that may be interconnected at longerons 180. Such a configuration may decrease a wetted surface area of modular fuselage assembly 100, may decrease wind resistance of the modular fuselage assembly, and/or may decrease fuel burn in aircraft 10 that include the modular fuselage assembly when compared to conventional fuselages of conventional that are circular, or at least substantially circular, in transverse cross-section.

As another example, the modular nature of modular fuselage assemblies 100 may permit a relatively small number of components, namely, fuselage lobes 110 and longerons 180, to be assembled in a variety of configurations to form and/or define a variety of different fuselages for aircraft 10. As a more specific example, a number of frame members 130 within fuselage lobes 110 simply may be increased to increase a length of modular fuselage assembly 100.

As another example, and as discussed in more detail herein, simple replacement of a portion of the frame members 130 within a given fuselage lobe 110 with differently shaped frame members 130 may permit formation of more complex fuselage shapes, such as those that may include a flight deck region. As yet another example, and as discussed in more detail herein, the simple replacement of a portion of the frame members 130 within the given fuselage lobe 110 with differently functioned frame members 130 may permit inclusion of wings, tails, and/or landing gear within the modular fuselage assembly.

As another example, modular fuselage assemblies 100 may permit and/or facilitate formation of the flight deck region and/or attachment of wings, tails, and/or landing gear without inclusion of structure within cargo hold 104 of the aircraft, making modular fuselage assemblies 100 more efficient for use within freighter aircraft configured to haul freight.

Frame members 130 may include any suitable structure that may be operatively attached to lobe skin 170, that may be operatively attached to longerons 180, that may operatively attach fuselage lobes 110 to longerons 180, and/or that may provide structural support for modular fuselage assembly 100 and/or for fuselage lobes 110 thereof. As illustrated collectively by FIGS. 1-7, frame members 130, or each frame member 130, may extend perpendicular, or at least substantially perpendicular, to longitudinal axis 102. Additionally or alternatively, each frame member 130 may extend between a corresponding pair of longerons 180 and/or may operatively attach the corresponding pair of longerons 180 to one another.

Frame members 130 and/or components thereof may be formed from and/or defined by any suitable material and/or materials. Examples of materials that may be included in frame members 130 and/or in any suitable component thereof include aluminum, aircraft grade aluminum, and/or a composite material.

As illustrated in dashed lines in FIG. 3 and in solid lines in FIGS. 5-7, frame members 130, or at least a subset of the plurality of frame members 130, may include a compression member 140. Compression member 140, when present, may at least partially bound cargo hold 104. Compression member 140 may be configured to receive and/or to resist a compressive force that may be applied thereto, such as along an elongate axis thereof. Stated another way, and during operation of modular fuselage assembly 100, compression member 140 may be in compression and/or may receive the compressive force. An example of compression member 140 includes a linear compression member 140. Further examples of compression member 140 include an elongate compression member, a linear compression member, and/or an at least substantially linear compression member.

During operation of modular fuselage assemblies 100 with non-circular transverse cross-sectional shapes, internal pressure may deform the modular fuselage assemblies and/ or may urge the modular fuselage assemblies toward a more circular transverse cross-sectional shape (e.g., by urging longerons 180 toward one another). The inclusion of compression members 140 in frame members 130 may resist a potential for such deformation of the modular fuselage assemblies.

As also illustrated in dashed lines in FIG. 3 and in solid lines in FIGS. 5-7, frame members 130, or at least a subset of the plurality of frame members 130, may include a tension member 150. Tension member 150 may be operatively attached to and/or may mechanically support lobe skin 170. Additionally or alternatively, tension member 150 may be shaped such that each fuselage lobe 110 and/or lobe skin 170 thereof has and/or defines a convex external surface 156, and it is within the scope of the present disclosure that fuselage lobes 110 collectively may define a modular fuselage assembly 100 with a non-circular and/or scalloped transverse cross-sectional shape, as perhaps best illustrated in FIGS. 5-7.

Tension member 150 may be configured to resist a tensile force that may be applied thereto, such as between ends thereof. Stated another way, and during operation of modular fuselage assembly 100, tension member 150 may be in tension and/or may receive the tensile force. An example of tension member 150 includes an arcuate tension member 150.

As illustrated in FIGS. 3-7, compression member 140 may have and/or define a first compression member end 142 and a second compression member end 144. Similarly, tension member 150 may have and/or define a first tension member end 152 and a second tension member end 154. First tension member end 152 may be operatively attached to first compression member end 142. Similarly, second tension member end 154 may be operatively attached to second compression member end 144.

As illustrated in dashed lines in FIG. 3 and in solid lines in FIGS. 5-7, frame members 130, or at least a subset of the plurality of frame members 130, may include a frame member brace structure 160. Frame member brace structure 160, when present, may be configured to operatively interconnect compression member 140 and tension member 150, such as to increase a rigidity of each frame member 130. An example of frame member brace structure 160 includes a stanchion 162, or a plurality of stanchions 162, as illustrated in FIGS. 3 and 6. Stanchions 162 may extend between and/or be operatively attached to both compression member 140 and tension member 150. Another example of frame member brace structure 160 includes a truss 164, or a plurality of trusses 164, as illustrated in FIGS. 3, 5, and 7. Trusses 164 also may extend between and/or be operatively attached to both compression member 140 and tension member 150. Examples of trusses 164 include a triangular truss and/or a warren truss.

As illustrated in dashed lines in FIG. 3 and in solid lines in FIG. 7, frame members 130, or at least a subset of the plurality of frame members 130, may include and/or be single-piece, monolithic, and/or unitary frame members 132. Additionally or alternatively, frame members 130, or at least a subset of the plurality of frame members 130, may include and/or be a stamped and/or roll-formed metallic frame member that may be formed and/or defined from a sheet of metal.

Longerons 180 may include any suitable structure that extends along longitudinal axis 102 of modular fuselage assembly 100, that is configured to be operatively attached to at least two fuselage lobes 110, and/or that at least partially bounds cargo hold 104. As examples, longerons 180 may include and/or be single-piece, monolithic, and/or unitary longerons 180. Stated another way, each longeron may extend along an entirety of a longitudinal length of modular fuselage assembly 100. As another example, longerons 180 may include and/or be a composite longeron 190, such as may be defined by a plurality of longeron substructures 192 that may be operatively attached to one another with a plurality of longeron fasteners 194, as illustrated in FIGS. 2 and 4. Stated another way, each longeron sub-structure 192 may extend along a portion, or a fraction, of the longitudinal length of modular fuselage assembly 100. Examples of longeron fasteners 194 include bolts, nuts, and/or rivets.

Fuselage lobes 110 may be operatively attached to longerons 180 in any suitable manner. As an example, and as illustrated in FIGS. 2-4, one or more lobe fasteners 128 may operatively attach each fuselage lobe 110 to corresponding longerons 180. Examples of lobe fasteners 128 include bolts, nuts, and/or rivets.

Figure 8:
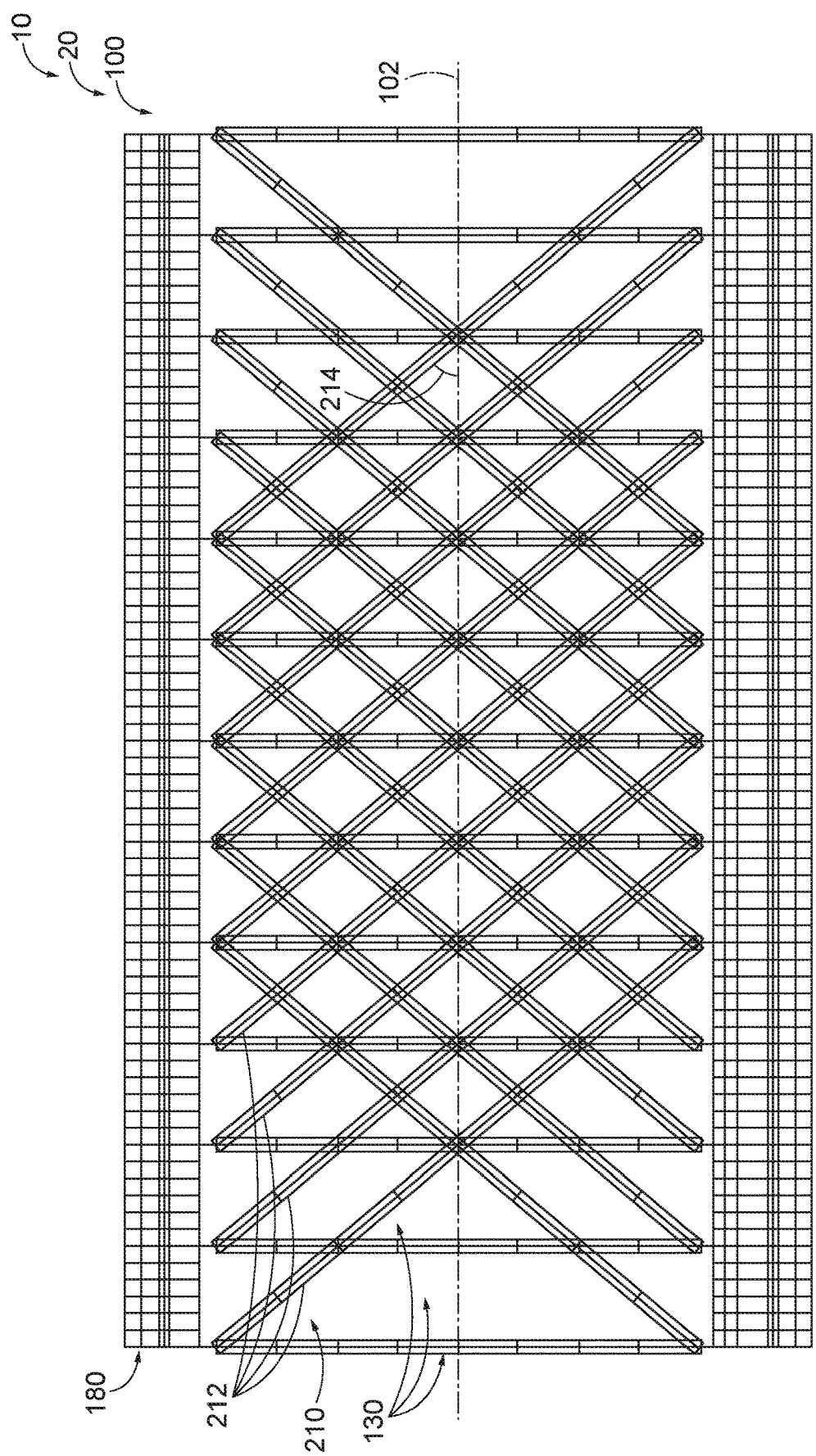
FIG. 8 is a less schematic longitudinal cross-sectional view of an example of a modular fuselage assembly according to the present disclosure.

As illustrated schematically in FIGS. 3-4 and less schematically in FIG. 8, modular fuselage assemblies 100 may include a longitudinal brace structure 210. Longitudinal brace structure 210, when present, may extend along at least a fraction, or even an entirety of longitudinal axis 102, or the longitudinal length, of modular fuselage assembly 100. Additionally or alternatively, longitudinal brace structure 210 may be operatively attached to the plurality of frame members 130 within a given fuselage lobe 110, to at least a subset of the plurality of frame members within the given fuselage lobe, or even to all of the plurality of frame members within the given fuselage lobe. Longitudinal brace structure 210 also may be referred to herein as a shear web and may be configured to brace frame members 130, to support load distribution along the longitudinal length of modular fuselage assembly 100, and/or to resist bending and/or twisting of the modular fuselage assembly about and/or along longitudinal axis 102.

In some examples, longitudinal brace structure 210 may include and/or be a continuous, a stamped, a monolithic, a unitary, a roll-formed, and/or a formed longitudinal brace structure 216, such as may extend along an entirety of the longitudinal length of the modular fuselage assembly. In some examples, longitudinal brace structure 210 may include and/or be a plurality of strips 212 of bracing material. Strips 212 of bracing material may extend at a skew angle 214 relative to longitudinal axis 102 of modular fuselage assembly 100, as illustrated in FIGS. 4 and 8.

As illustrated, longitudinal brace structure 210 may bound, or at least partially bound, cargo hold 104. Such a configuration may protect frame members 130 and/or lobe skin 170 from cargo 80 that may be positioned within cargo hold 104. Stated another way, the presence of longitudinal brace structure 210 may decrease a potential for damage to frame members 130 and/or lobe skin 170 that may be caused by contact with and/or impact by cargo 80.

Figure 9:
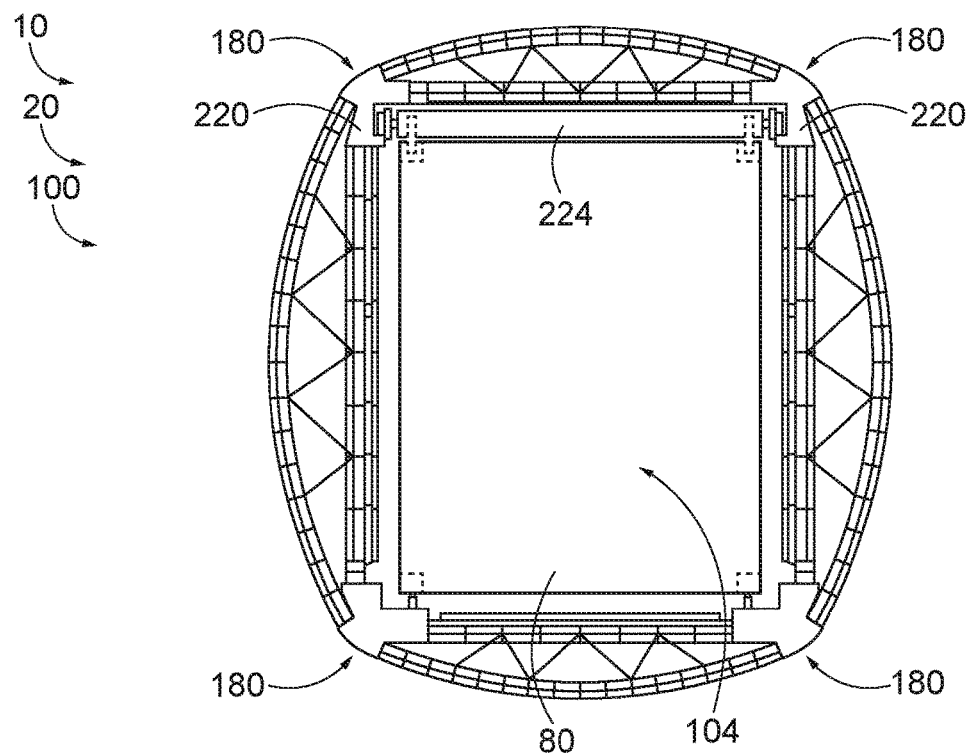
FIG. 9 is a less schematic transverse cross-sectional view of an example of a modular fuselage assembly illustrating incorporation of a crane rail, according to the present disclosure.
Figure 10:
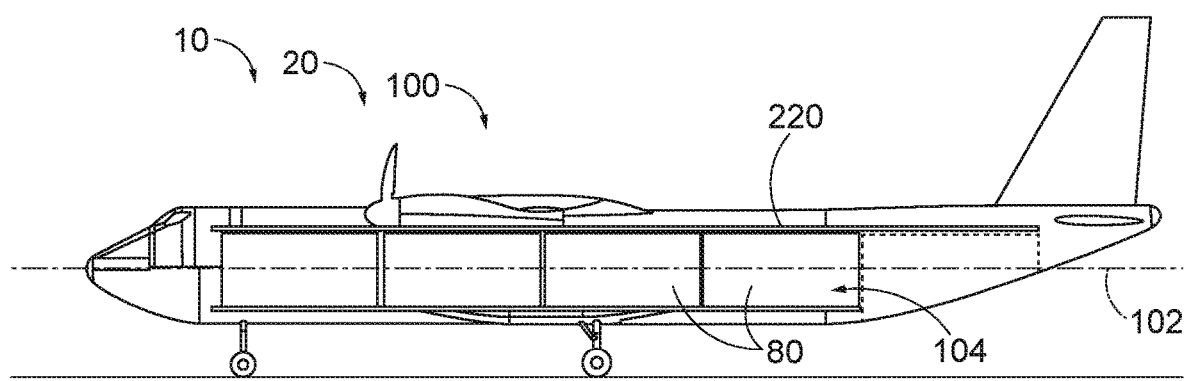
FIG. 10 is a less schematic and partially cut-away side view of an aircraft that includes the modular fuselage assembly and the crane rail of FIG. 9.

As illustrated in dashed lines in FIG. 3 and in solid lines in FIGS. 9-10, modular fuselage assembly 100 may include, may form, and/or may define a crane rail 220. Crane rail 220 may extend along the length of modular fuselage assembly 100, along the length of at least one, or even two, longerons 180 of the modular fuselage assembly, and/or along the length of cargo hold 104.

As illustrated in dashed lines in FIG. 3 and in solid lines in FIG. 9, modular fuselage assembly 100 also may include a cargo transport structure 224. Cargo transport structure 224 may be operatively, or rollingly, attached to crane rail 220 and may be configured to move cargo 80 within cargo hold 104 and/or along longitudinal axis 102 of modular fuselage assembly 100.

As discussed, fuselage lobes 110 include lobe skin 170 that may be operatively attached to the plurality of frame members 130 within a given fuselage lobe 110 and/or that may define external surface 120 of each fuselage lobe. In some examples, lobe skin 170 may include and/or be a unitary, a monolithic, and/or a continuous lobe skin 170 that may extend along an entirety of longitudinal axis 102 and/or along an entirety of the longitudinal length of each fuselage lobe. Additionally or alternatively, in some examples, lobe skin 170 may include a plurality of sub-skins 172, each of which may be operatively attached to a subset of the plurality of frame members 130 and/or each of which may extend along a fraction of the longitudinal length of each fuselage lobe 110, as illustrated in FIG. 2. Examples of the subset of the plurality of frame members 130 include at least 2, at least 3, at least 4, at least 5, at least 6, at least 10%, at least 25%, and/or at least 50% of the plurality of frame members. Examples of the fraction of the longitudinal length of each fuselage lobe include at least 5%, at least 10%, at least 20%, at least 30%, at least 40%, and/or at least 50% of the longitudinal length of each fuselage lobe.

Figure 11:
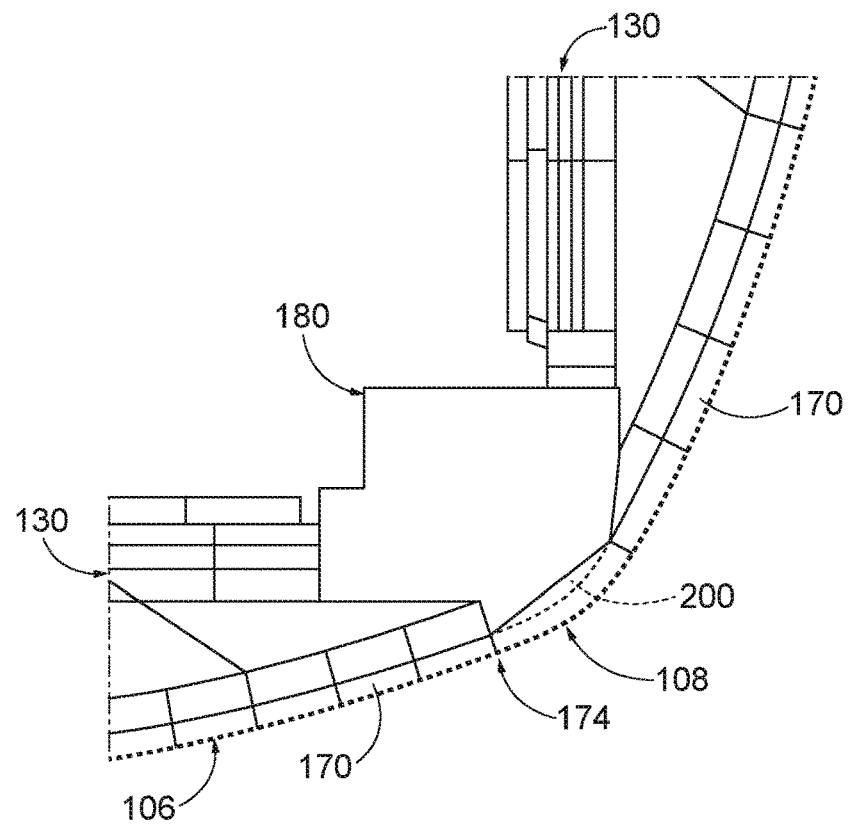
FIG. 11 is a less schematic transverse cross-sectional view of an example of a region of a modular fuselage assembly according to the present disclosure.
Figure 12:
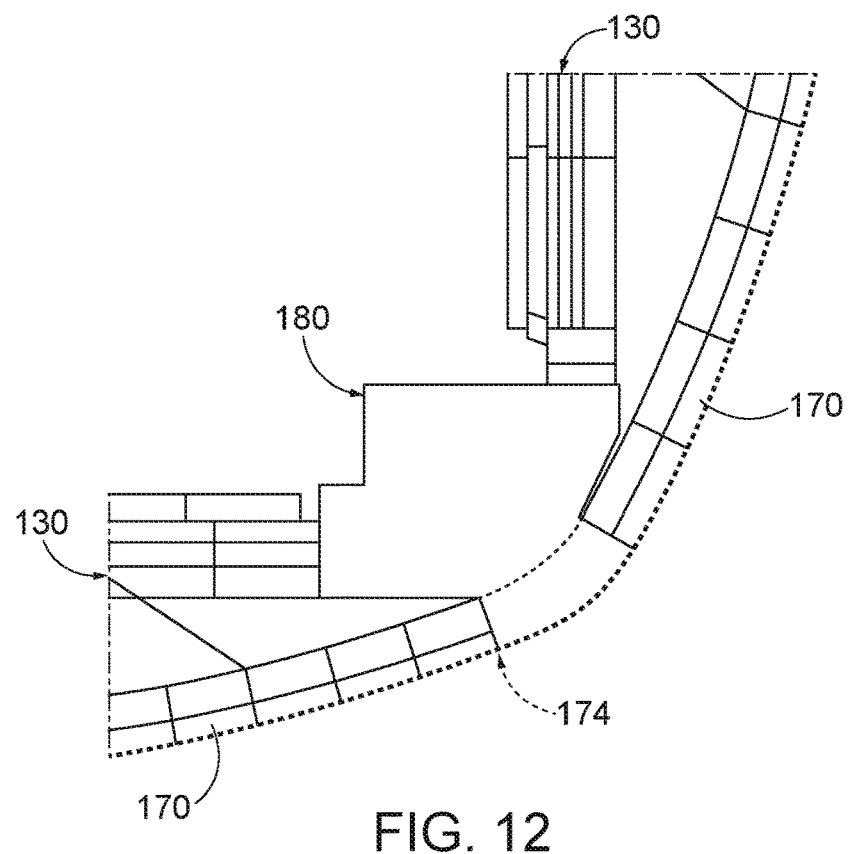
FIG. 12 is a less schematic transverse cross-sectional view of an example of a region of a modular fuselage assembly according to the present disclosure.
Figure 13:
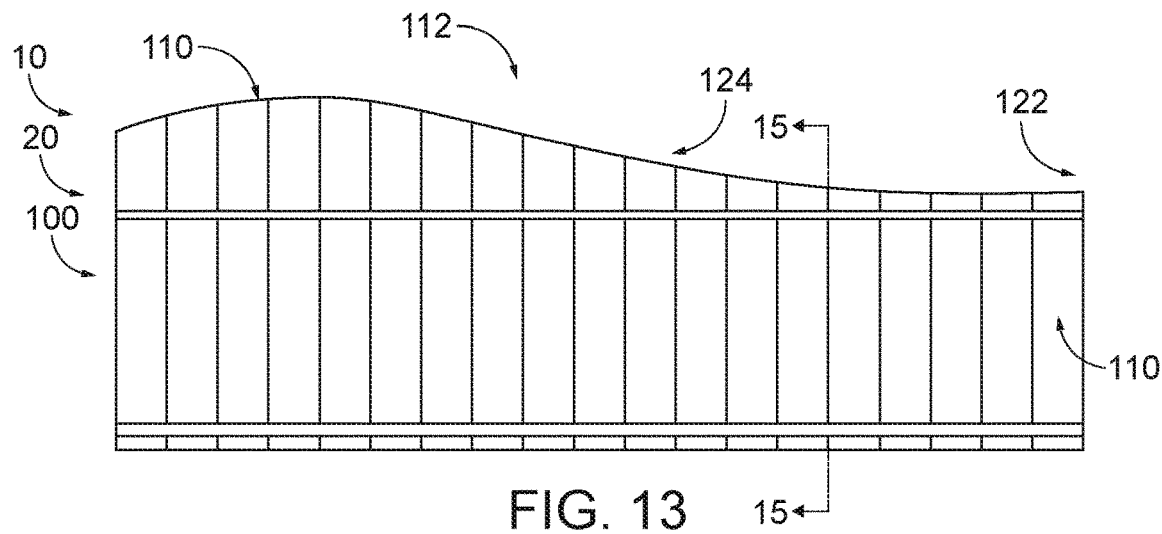
FIG. 13 is a schematic illustration of an example of a portion of a modular fuselage assembly illustrating both a top lobe deck region and a top lobe cargo region, according to the present disclosure.

As illustrated in dashed lines in FIG. 3 and in solid lines in FIG. 11, at least one longeron 180 may be internal to a skin mold line 174 of lobe skin 170. In this configuration, modular fuselage assembly 100 may include thermal insulation 200, which may extend between the at least one longeron 180 and lobe skin 170, that may at least partially define a region 108 of an outer surface 106 of the modular fuselage assembly, and/or that may thermally insulate the at least one longeron 180. Additionally or alternatively, and as illustrated in solid lines in FIGS. 3 and 12, at least one longeron 180 may define, or at least partially define, region 108 of outer surface 106 of modular fuselage assembly 100. Stated another way, the at least one longeron 180 may be at skin mold line 174 of lobe skin 170.

In some examples, the plurality of fuselage lobes 110 may include a top lobe 112, a bottom lobe 114, a left side lobe 116, and a right side lobe 118, as collectively illustrated in FIGS. 2-7. In these examples, the plurality of longerons 180 may include an upper left longeron 182, an upper right longeron 184, a lower left longeron 186, and a lower right longeron 188. As illustrated, upper left longeron 182 may be operatively attached to top lobe 112 and also to left side lobe 116, and upper right longeron 184 may be operatively attached to top lobe 112 and also to right side lobe 118. Similarly, lower left longeron 186 may be operatively attached to bottom lobe 114 and also to left side lobe 116 and lower right longeron 188 may be operatively attached to bottom lobe 114 and also to right side lobe 118.

It is within the scope of the present disclosure that modular fuselage assemblies 100, according to the present disclosure, may have a uniform, an at least substantially uniform, a constant, and/or an at least substantially constant transverse cross-sectional shape along the longitudinal length of the modular fuselage assemblies. Alternatively, and as illustrated in FIGS. 2-4 and 13-15, modular fuselage assemblies 100 may include two or more distinct, or different, regions. As discussed herein, these distinct regions may be formed and/or defined simply by replacing and/or modifying a portion, or a region, of a given fuselage lobe 110 and/or of corresponding frame members 130 and/or lobe skin 170 of the given fuselage lobe, thereby permitting rapid, efficient, and/or cost-effective modification and/or assembly of modular fuselage assemblies 100. As also discussed herein, the replacement and/or modified portions of the given fuselage lobe 110 may modify external surface 120 of modular fuselage assembly 100 and/or external surface 120 of the given fuselage lobe without, or without necessarily, also modifying a shape of cargo hold 104.

As an example, modular fuselage assemblies 100 may include a top lobe 112 that includes both a top lobe cargo region 122 and a top lobe flight deck region 124, as illustrated in FIGS. 2-4, and 13-15. Top lobe cargo region 122 may have and/or define a cargo region shape that differs from a flight deck region shape of top lobe flight deck region 124. As an example, a transverse cross-sectional area of modular fuselage assembly 100 as measured within top lobe flight deck region 124 may be greater than a transverse cross-sectional area of the modular fuselage assembly as measured within top lobe cargo region 122. As another example, a transverse cross-section of top lobe cargo region 122 may be uniform, or at least substantially uniform, along a longitudinal length thereof. However, a transverse cross-section of top lobe flight deck region 124 may vary along the longitudinal length thereof, as illustrated.

Figure 14:
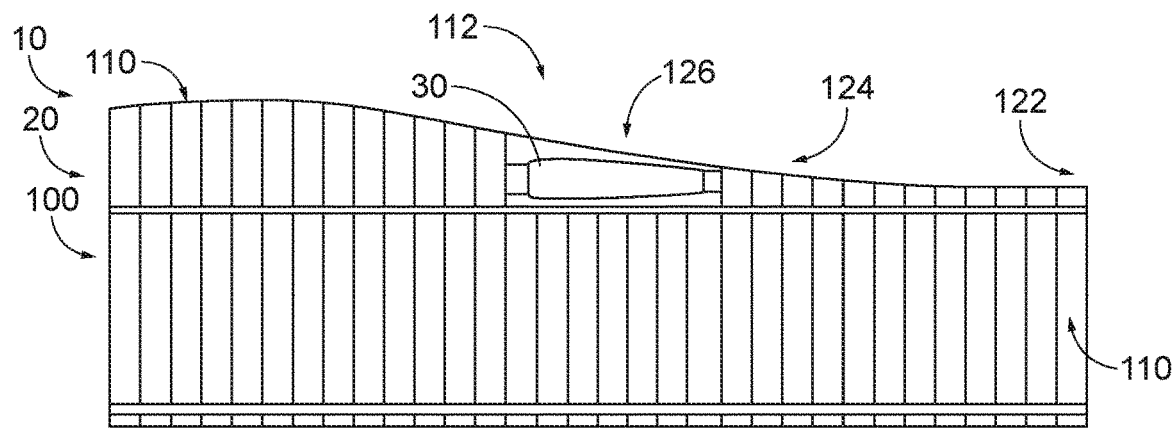
FIG. 14 is a schematic illustration of another example of a portion of a modular fuselage assembly illustrating a top lobe deck region, a top lobe cargo region, and a wing-receiving region, according to the present disclosure.
Figure 15:
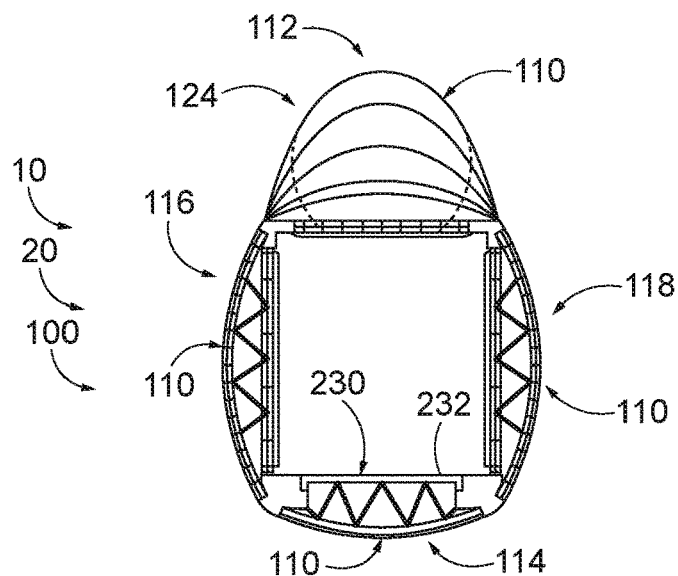
FIG. 15 is a transverse cross-sectional view of the modular fuselage assembly of FIG. 13 taken along line 15-15 of FIG. 13.

As another example, modular fuselage assemblies 100 may include a wing-receiving region 126 configured to receive a wing 30, as illustrated in FIGS. 2, 4, and 14. Wing-receiving region 126 may be formed and/or defined in, within, and/or by at least one fuselage lobe 110 of modular fuselage assemblies 100. The at least one fuselage lobe 110 may include top lobe 112 and/or bottom lobe 114, and modular fuselage assemblies 100 may be configured such that wing-receiving region 126 does not extend into cargo hold 104 and/or such that the transverse cross-sectional shape of a region of cargo hold 104 that is at least partially defined by wing-receiving region 126 is the same, or at least substantially the same, as the transverse cross-sectional shape of a remainder of the cargo hold. Additionally or alternatively, wing-receiving region 126 may permit wing 30 to penetrate the fuselage loft surface, and reduce drag, without interruption, or without a change in, the structure of longerons 180. Such a configuration may facilitate manufacturing of modular fuselage assemblies 100 and/or may permit longerons 180 to be the primary structures that carry, or that support, longitudinal fuselage bending loads.

As illustrated in dashed lines in FIGS. 3-4 and in solid lines in FIGS. 5-7, modular fuselage assemblies 100 may include a floor structure 230. Floor structure 230 may be operatively attached to and/or at least partially defined by bottom lobe 114 of modular fuselage assemblies 100 and may form and/or define a floor surface 232 configured to support personnel, passengers, and/or cargo 80. Floor structure 230 and/or floor surface 232 thereof may at least partially bound and/or define cargo hold 104, as illustrated.

Figure 16:
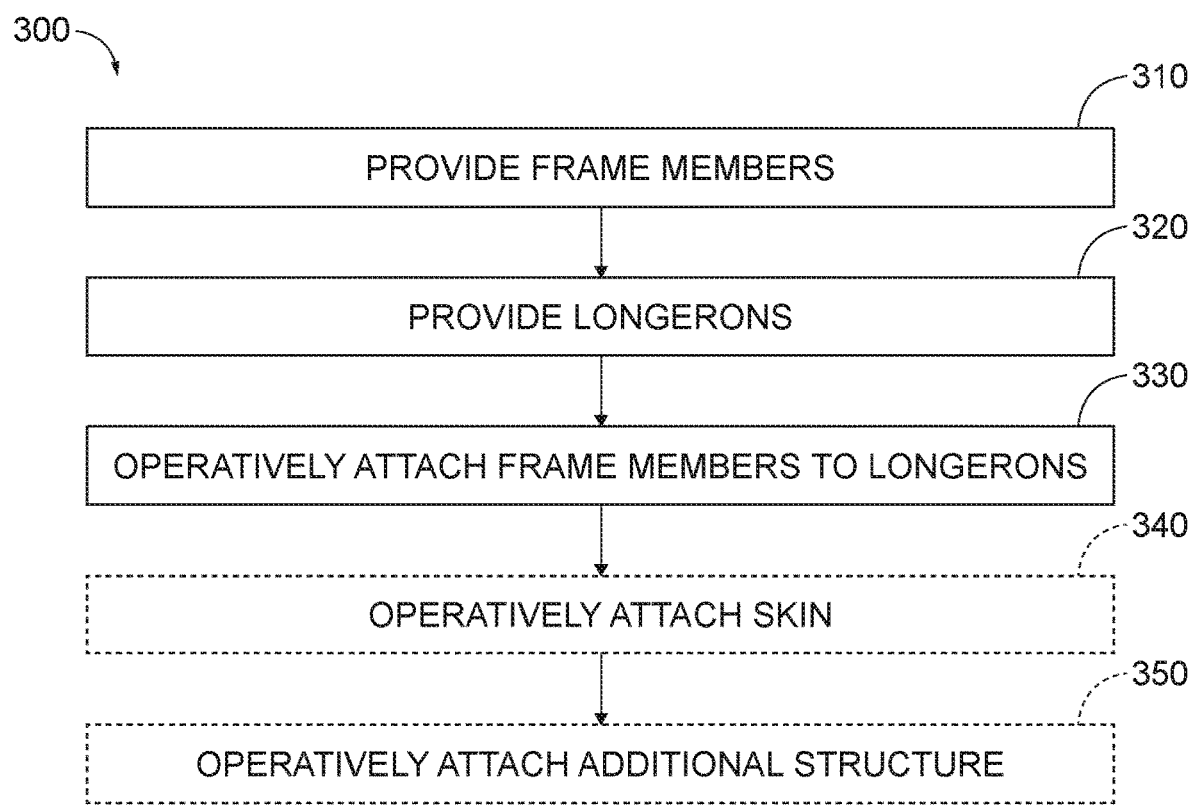
FIG. 16 is a flowchart depicting methods of assembling a modular fuselage assembly, according to the present disclosure.

FIG. 16 is a flowchart depicting methods 300 of assembling a modular fuselage assembly, such as modular fuselage assembly 100 of FIGS. 1-15, according to the present disclosure. Methods 300 include providing frame members at 310 and providing longerons at 320. Methods 300 also include operatively attaching frame members to longerons at 330 and may include operatively attaching a lobe skin at 340 and/or operatively attaching an additional structure at 350.

Providing the frame members at 310 may include providing a plurality of frame members. Examples of the frame members are disclosed herein with reference to frame members 130 of FIGS. 2-8 and 11-12.

In some examples, the providing the frame members at 310 may include providing the plurality of frame members as a part of, or as an assembly that defines, a plurality of fuselage lobes, examples of which are disclosed herein with reference to fuselage lobes 110 of FIGS. 2-8 and 11-12. In these examples, each fuselage lobe may include a subset of the plurality of frame members and a lobe skin. The lobe skin may be operatively attached to the subset of the plurality of frame members and may extend along, may form, and/or may define an external surface of each fuselage lobe. Examples of the lobe skin are disclosed herein with reference to lobe skin 170 of FIGS. 2-7 and 11-12.

Providing the longerons at 320 may include providing a plurality of longerons. Examples of the longerons are disclosed herein with reference to longerons 180 of FIGS. 2-8.

Operatively attaching the frame members to the longerons at 330 may include operatively attaching each frame member of the plurality of frame members to at least two longerons of the plurality of longerons. This may include operatively attaching such that the plurality of longerons extends along a longitudinal axis of the modular fuselage assembly and/or such that the plurality of frame members extends perpendicular, or at least substantially perpendicular, to the longitudinal axis of the modular fuselage assembly.

When the providing the frame members at 310 includes providing the plurality of frame members as part of the plurality of fuselage lobes, the operatively attaching at 330 may include operatively attaching at least two fuselage lobes to each longeron. Additionally or alternatively, the operatively attaching at 330 may include operatively attaching each fuselage lobe to at least two longerons.

In some examples, the providing the frame members at 310 may include providing the plurality of frame members independent from, separate from, and/or without the lobe skin. In these examples, methods 300 also may include operatively attaching the lobe skin at 340. The operatively attaching the lobe skin at 340 may be performed subsequent to the operatively attaching at 330 and/or may include operatively attaching the lobe skin to an external surface of the plurality of frame members. This may include operatively attaching to from and/or define an outer surface of the modular fuselage assembly.

Operatively attaching the additional structure at 350 may include operatively attaching any suitable additional structure to the modular fuselage assembly in any suitable manner and/or in any suitable sequence. As an example, the operatively attaching at 350 may include operatively attaching any suitable structure and/or structures that are disclosed, described, and/or illustrated herein as being operatively attached to the modular fuselage assembly and/or as forming a portion of an aircraft that includes the modular fuselage assembly. This may include operatively attaching the suitable structure and/or structures to at least one frame member of the plurality of frame members, to the plurality of frame members, to at least one longeron of the plurality of longerons, and/or to the plurality of longerons.

Illustrative, non-exclusive examples of inventive subject matter according to the present disclosure are described in the following enumerated paragraphs:

A1. A modular fuselage assembly for an aircraft, the modular fuselage assembly comprising:

a plurality of fuselage lobes extending along a longitudinal axis of the modular fuselage assembly, wherein each fuselage lobe of the plurality of fuselage lobes includes:

(i) a plurality of frame members; and (ii) a lobe skin that is operatively attached to the plurality of frame members and defines an external surface of each fuselage lobe; and a plurality of longerons extending along the longitudinal axis of the modular fuselage assembly;

wherein at least two fuselage lobes of the plurality of fuselage lobes are operatively, or directly and operatively, attached to each longeron of the plurality of longerons; and wherein the plurality of fuselage lobes and the plurality of longerons at least partially bound a cargo hold defined within the modular fuselage assembly.

A2. The modular fuselage assembly of paragraph A1, wherein the plurality of fuselage lobes includes a top lobe, a bottom lobe, a left side lobe, and a right side lobe.

A3. The modular fuselage assembly of paragraph A2, wherein the plurality of longerons includes:

(i) an upper left longeron, which is operatively, or directly and operatively, attached to the top lobe and to the left side lobe;

(ii) an upper right longeron, which is operatively, or directly and operatively, attached to the top lobe and to the right side lobe;

(iii) a lower left longeron, which is operatively, or directly and operatively, attached to the bottom lobe and to the left side lobe; and (iv) a lower right longeron, which is operatively, or directly and operatively, attached to the bottom lobe and to the right side lobe.

A4. The modular fuselage assembly of any of paragraphs A2-A3, wherein the top lobe includes a top lobe cargo region that defines a cargo region shape and a top lobe flight deck region that defines a flight deck region shape that differs from the cargo region shape.

A5. The modular fuselage assembly of paragraph A4, wherein a transverse cross-sectional area of the modular fuselage assembly as measured within the top lobe flight deck region is greater than a transverse cross-sectional area of the modular fuselage assembly as measured within the top lobe cargo region.

A6. The modular fuselage assembly of any of paragraphs A1-A5, wherein at least one fuselage lobe of the plurality of fuselage lobes further includes a wing-receiving region configured to be operatively attached to a wing of the aircraft.

A7. The modular fuselage assembly of paragraph A6, wherein the at least one fuselage lobe includes at least one of a/the top lobe and a/the bottom lobe.

A8. The modular fuselage assembly of any of paragraphs A1-A7, wherein each frame member of the plurality of frame members extends perpendicular, or at least substantially perpendicular, to the longitudinal axis of the modular fuselage assembly.

A9. The modular fuselage assembly of any of paragraphs A1-A8, wherein at least a subset of the plurality of frame members includes a compression member.

A10. The modular fuselage assembly of paragraph A9, wherein the compression member at least partially bounds the cargo hold.

A11. The modular fuselage assembly of any of paragraphs A9-A10, wherein the compression member includes a linear compression member.

A12. The modular fuselage assembly of any of paragraphs A9-A11, wherein each frame member of the at least the subset of the plurality of frame members includes a tension member.

A13. The modular fuselage assembly of paragraph A12, wherein the compression member includes a first compression member end and a second compression member end, and further wherein the tension member includes a first tension member end, which is operatively, or directly and operatively, attached to the first compression member end, and a second tension member end, which is operatively, or directly and operatively, attached to the second compression member end.

A14. The modular fuselage assembly of paragraph A13, wherein the tension member is an arcuate tension member.

A15. The modular fuselage assembly of paragraph A14, wherein the arcuate tension member is shaped such that each fuselage lobe defines a convex external surface.

A16. The modular fuselage assembly of any of paragraphs A13-A15, wherein the tension member is operatively, or directly and operatively, attached to the lobe skin.

A17. The modular fuselage assembly of any of paragraphs A12-A16, wherein each frame member further includes a frame member brace structure configured to operatively interconnect the compression member and the tension member to increase a rigidity of each frame member.

A18. The modular fuselage assembly of paragraph A17, wherein the frame member brace structure includes at least one of:
  (i) a stanchion, optionally wherein the stanchion extends between, and is operatively, or directly and operatively, attached to the compression member and the tension member;
  (ii) a plurality of stanchions, optionally wherein each stanchion of the plurality of stanchions extends between, and is operatively, or directly and operatively, attached to the compression member and the tension member;
  (iii) a truss, optionally wherein the truss extends between, and is operatively, or directly and operatively, attached to the compression member and the tension member;
  (iv) a triangular truss, optionally wherein the triangular truss extends between, and is operatively, or directly and operatively, attached to the compression member and the tension member; and
  (v) a Warren truss, optionally wherein the Warren truss extends between, and is operatively, or directly and operatively, attached to the compression member and the tension member.

A19. The modular fuselage assembly of any of paragraphs A1-A18, wherein at least a subset of the plurality of frame members includes at least one of:
  (i) a single-piece frame member;
  (ii) a monolithic frame member; and
  (iii) a unitary frame member.

A20. The modular fuselage assembly of any of paragraphs A1-A19, wherein at least a subset of the plurality of frame members includes at least one of:
  (i) a stamped metallic frame member defined from a sheet of metal; and
  (ii) a roll-formed metallic frame member defined from the sheet of metal.

A21. The modular fuselage assembly of any of paragraphs A1-A20, wherein the plurality of longerons includes at least one of:
  (i) a single-piece longeron;
  (ii) a monolithic longeron; and
  (iii) a unitary longeron.

A22. The modular fuselage assembly of any of paragraphs A1-A21, wherein the plurality of longerons includes a composite longeron defined by a plurality of longeron sub-structures.

A23. The modular fuselage assembly of paragraph A22, wherein each longeron sub-structure of the plurality of longeron sub-structures is operatively attached to the other longeron sub-structures of the plurality of longeron sub-structures, optionally with a plurality of longeron fasteners.

A31. The modular fuselage assembly of any of paragraphs A1-A30, wherein the at least two fuselage lobes are operatively attached to each longeron with a plurality of lobe fasteners.

A32. The modular fuselage assembly of any of paragraphs A1-A31, wherein the modular fuselage assembly further includes a longitudinal brace structure that extends along at least a fraction, and optionally an entirety, of the longitudinal axis of the modular fuselage assembly.

A33. The modular fuselage assembly of paragraph A32, wherein the longitudinal brace structure is operatively attached to the plurality of frame members within a given fuselage lobe of the plurality of fuselage lobes.

A34. The modular fuselage assembly of any of paragraphs A32-A33, wherein the longitudinal brace structure includes a plurality of strips of bracing material.

A35. The modular fuselage assembly of paragraph A34, wherein the plurality of strips of bracing material extends at a skew angle relative to the longitudinal axis of the modular fuselage assembly.

A36. The modular fuselage assembly of any of paragraphs A32-A35, wherein the longitudinal brace structure at least partially bounds the cargo hold.

A37. The modular fuselage assembly of any of paragraphs A1-A36, wherein the modular fuselage assembly further includes a crane rail and a cargo transport structure that is operatively attached to the crane rail and configured to move cargo within the cargo hold and along the longitudinal axis of the modular fuselage assembly.

A38. The modular fuselage assembly of paragraph A37, wherein the cargo transport structure includes a rail trolley configured to roll along the crane rail.

A39. The modular fuselage assembly of any of paragraphs A37-A38, wherein the crane rail is at least one of:
  (i) operatively attached to at least one longeron of the plurality of longerons; and
  (ii) defined by at least one longeron of the plurality of longerons.

A40. The modular fuselage assembly of any of paragraphs A1-A39, wherein the plurality of fuselage lobes includes a/the bottom lobe, and further wherein the modular fuselage assembly includes a floor structure that is operatively attached to the plurality of frame members of the bottom lobe.

A41. The modular fuselage assembly of paragraph A40, wherein the floor structure at least partially bounds the cargo hold.

A42. An aircraft, comprising:
  the modular fuselage assembly of any of paragraphs A1-A41; and
  at least one of:
  (i) a wing that is operatively attached to the modular fuselage assembly;
  (ii) a tail assembly that is operatively attached to the modular fuselage assembly;
  (iii) a vertical stabilizer that is operatively attached to the modular fuselage assembly;
  (iv) a horizontal stabilizer that is operatively attached to the modular fuselage assembly; and
  (v) an engine that is operatively attached to the modular fuselage assembly.

B1. A method of assembling a modular fuselage assembly, the method comprising:
  providing a plurality of frame members;
  providing a plurality of longerons; and
  operatively attaching each frame member of the plurality of frame members to at least two longerons of the plurality of longerons such that the plurality of longerons extends along a longitudinal axis of the modular fuselage assembly.

B2. The method of paragraph B1, wherein the providing the plurality of frame members includes providing the plurality of frame members as part of a plurality of fuselage lobes, wherein each fuselage lobe of the plurality of fuselage lobes includes:

(i) a subset of the plurality of frame members; and
(ii) a lobe skin that is operatively attached to the subset of the plurality of frame members and extends along an external surface of each fuselage lobe.

B3. The method of paragraph B2, wherein the operatively attaching includes operatively attaching at least two fuselage lobes of the plurality of fuselage lobes to each longeron of the plurality of longerons.

B4. The method of any of paragraphs B2-B3, wherein the operatively attaching includes operatively attaching each fuselage lobe of the plurality of fuselage lobes to at least two longerons of the plurality of longerons.

B5. The method of any of paragraphs B1-B4, wherein, subsequent to the operatively attaching each frame member, the method further includes operatively attaching a lobe skin to an external surface of the plurality of frame members.

B6. The method of any of paragraphs B1-B5, wherein the operatively attaching includes operatively attaching each frame member such that the plurality of frame members extends perpendicular, or at least substantially perpendicular, to the longitudinal axis of the fuselage assembly.

B7. The method of any of paragraphs B1-B6, wherein the modular fuselage assembly includes any suitable structure of any of the modular fuselage assemblies of any of paragraphs A1-A41.

B8. The method of any of paragraphs B1-B7, wherein the method further includes operatively attaching any suitable structure of any of the modular fuselage assemblies of any of paragraphs A1-A41 to at least one of:

(i) at least one frame member of the plurality of frame members;
(ii) the plurality of frame members;
(iii) at least one longeron of the plurality of longerons; and
(iv) the plurality of longerons.

C1. The use of any of the modular fuselage assemblies of any of paragraphs A1-A41 with any of the methods of any of paragraphs B1-B8.

C2. The use of any of the methods of any of paragraphs B1-B8 with any of the modular fuselage assemblies of any of paragraphs A1-A41.

C3. The use of a plurality of fuselage lobes and a plurality of longerons to define a modular fuselage assembly.

C4. The use of a plurality of frame members and a lobe skin to define a fuselage lobe of a modular fuselage assembly.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

As used herein, the phrase, "operatively attached" may mean that two structures, members, and/or components may be attached to one another and/or mechanically coupled to one another. It is within the scope of the present disclosure that the phrase, "operatively attached" may refer to two structures that are mechanically coupled to one another such that the two structures contact, physically contact, and/or directly contact one another. In such an example, the two structures also may be referred to herein as being "directly and operatively attached" to one another. It is also within the scope of the present disclosure that the phrase, "operatively attached" may refer to two structures that are mechanically coupled to one another via one or more intermediate structures and/or such that the two structures do not contact, do not physically contact, and/or do not directly contact one another. In such an example, the two structures also may be referred to herein as being "indirectly and operatively attached" to one another.

The invention claimed is:

1. A modular fuselage assembly for an aircraft, the modular fuselage assembly comprising:
   a plurality of fuselage lobes extending along a longitudinal axis of the modular fuselage assembly, wherein each fuselage lobe of the plurality of fuselage lobes includes:
   (i) a plurality of frame members; and
   (ii) a lobe skin that is operatively attached to the plurality of frame members and defines an external surface of each fuselage lobe; and
   a plurality of longerons extending along the longitudinal axis of the modular fuselage assembly;
   wherein at least two fuselage lobes of the plurality of fuselage lobes are operatively attached to each longeron of the plurality of longerons;
   wherein the plurality of fuselage lobes and the plurality of longerons at least partially bound a cargo hold defined within the modular fuselage assembly;
   wherein at least a subset of the plurality of frame members includes a compression member that at least partially bounds the cargo hold;
   wherein each frame member of the at least the subset of the plurality of frame members further includes a tension member; and
   wherein each frame member further includes a frame member brace structure configured to operatively interconnect the compression member and the tension member to increase a rigidity of each frame member.

2. The modular fuselage assembly of claim 1, wherein at least one fuselage lobe of the plurality of fuselage lobes further includes a wing-receiving region configured to be operatively attached to a wing of the aircraft.

3. The modular fuselage assembly of claim 1, wherein each frame member of the plurality of frame members extends at least substantially perpendicular to the longitudinal axis of the modular fuselage assembly.

4. The modular fuselage assembly of claim 1, wherein the compression member includes a first compression member end and a second compression member end, wherein the tension member includes a first tension member end, which is operatively attached to the first compression member end, and a second tension member end, which is operatively attached to the second compression member end, and further wherein the tension member is an arcuate tension member shaped such that each fuselage lobe defines a convex external surface.

5. The modular fuselage assembly of claim 1, wherein the tension member is directly and operatively attached to the lobe skin.

6. The modular fuselage assembly of claim 1, wherein the frame member brace structure includes at least one of:
   (i) a stanchion, wherein the stanchion extends between, and is operatively attached to the compression member and the tension member;
   (ii) a plurality of stanchions, wherein each stanchion of the plurality of stanchions extends between, and is operatively attached to the compression member and the tension member;
   (iii) a truss, wherein the truss extends between, and is operatively attached to the compression member and the tension member;
   (iv) a triangular truss, wherein the triangular truss extends between, and is operatively attached to the compression member and the tension member; and
   (v) a Warren truss, wherein the Warren truss extends between, and is operatively attached to the compression member and the tension member.

7. The modular fuselage assembly of claim 1, wherein the plurality of longerons includes at least one of:
   (i) a single-piece longeron;
   (ii) a monolithic longeron; and
   (iii) a unitary longeron.

8. The modular fuselage assembly of claim 1, wherein the plurality of longerons includes a composite longeron defined by a plurality of longeron sub-structures.

9. The modular fuselage assembly of claim 1, wherein the lobe skin includes a unitary lobe skin that extends along an entirety of the longitudinal axis of the modular fuselage assembly.

10. The modular fuselage assembly of claim 1, wherein the lobe skin includes a plurality of sub-skins, wherein each sub-skin of the plurality of sub-skins is operatively attached to at least two frame members of the plurality of frame members.

11. The modular fuselage assembly of claim 1, wherein the at least two fuselage lobes are operatively attached to each longeron with a plurality of lobe fasteners.

12. The modular fuselage assembly of claim 1, wherein the modular fuselage assembly further includes a crane rail and a cargo transport structure that is operatively attached to the crane rail and configured to move cargo within the cargo hold and along the longitudinal axis of the modular fuselage assembly.

13. A method of assembling the modular fuselage assembly of claim 1, the method comprising:
   providing the plurality of frame members;
   providing the plurality of longerons; and operatively attaching each frame member of the plurality of frame members to at least two longerons of the plurality of longerons such that the plurality of longerons extends along the longitudinal axis of the modular fuselage assembly.

14. An aircraft, comprising:
the modular fuselage assembly of claim 1; and
at least one of:
(i) a wing that is operatively attached to the modular fuselage assembly;
(ii) a tail assembly that is operatively attached to the modular fuselage assembly;
(iii) a vertical stabilizer that is operatively attached to the modular fuselage assembly;
(iv) a horizontal stabilizer that is operatively attached to the modular fuselage assembly; and
(v) an engine that is operatively attached to the modular fuselage assembly.

15. The modular fuselage assembly of claim 1, wherein the frame member brace structure is configured to operatively interconnect a central region of the compression member and a central region of the tension member.

16. The modular fuselage assembly of claim 1, wherein the plurality of fuselage lobes includes a top lobe, a bottom lobe, a left side lobe, and a right side lobe, and further wherein the plurality of longerons includes:
(i) an upper left longeron, which is operatively attached to the top lobe and to the left side lobe;
(ii) an upper right longeron, which is operatively attached to the top lobe and to the right side lobe;
(iii) a lower left longeron, which is operatively attached to the bottom lobe and to the left side lobe; and
(iv) a lower right longeron, which is operatively attached to the bottom lobe and to the right side lobe.

17. The modular fuselage assembly of claim 16, wherein the top lobe includes a top lobe cargo region that defines a cargo region shape and a top lobe flight deck region that defines a flight deck region shape that differs from the cargo region shape.

18. The modular fuselage assembly of claim 1, wherein the modular fuselage assembly further includes a longitudinal brace structure that extends along at least a fraction of the longitudinal axis of the modular fuselage assembly.

19. The modular fuselage assembly of claim 18, wherein the longitudinal brace structure is operatively attached to the plurality of frame members within a given fuselage lobe of the plurality of fuselage lobes.

20. The modular fuselage assembly of claim 18, wherein the longitudinal brace structure is distinct from the plurality of longerons and includes a unitary modular brace structure that extends between, and is operatively attached to, at least two frame members of the plurality of frame members within a given fuselage lobe of the plurality of fuselage lobes.

21. A modular fuselage assembly for an aircraft, the modular fuselage assembly comprising:
a plurality of fuselage lobes extending along a longitudinal axis of the modular fuselage assembly, wherein each fuselage lobe of the plurality of fuselage lobes includes:
(i) a plurality of frame members; and
(ii) a lobe skin that is operatively attached to the plurality of frame members and defines an external surface of each fuselage lobe;
a plurality of longerons extending along the longitudinal axis of the modular fuselage assembly; and
a longitudinal brace structure that extends along at least a fraction of the longitudinal axis of the modular fuselage assembly;
wherein at least two fuselage lobes of the plurality of fuselage lobes are operatively attached to each longeron of the plurality of longerons;
wherein the plurality of fuselage lobes and the plurality of longerons at least partially bound a cargo hold defined within the modular fuselage assembly; and
wherein the longitudinal brace structure is distinct from the plurality of longerons and includes a unitary modular brace structure that extends between, and is operatively attached to, at least two frame members of the plurality of frame members within a given fuselage lobe of the plurality of fuselage lobes.

* * * * *